United States Patent
Landgraf

[11] 3,954,541
[45] May 4, 1976

[54] WELDING OF THERMOPLASTICS THROUGH RESISTANCE HEATING

[75] Inventor: Helmut Landgraf, Rumeln-Kaldenhausen, Germany

[73] Assignee: Mannesmann A.G., Dusseldorf, Germany

[22] Filed: Sept. 23, 1974

[21] Appl. No.: 408,185

Related U.S. Application Data

[63] Continuation of Ser. No. 256,384, May 24, 1972, abandoned.

[30] Foreign Application Priority Data
June 1, 1971 Germany .................. 7121715[U]

[52] U.S. Cl. .............................. 156/275; 156/306; 285/423
[51] Int. Cl.² .................... B32B 31/04; F16L 13/10
[58] Field of Search ........... 156/275, 322, 306, 272; 219/243, 544; 285/423

[56] References Cited
UNITED STATES PATENTS

| | | | |
|---|---|---|---|
| 2,974,566 | 3/1961 | Hurley | 156/275 X |
| 3,061,503 | 10/1962 | Gould et al. | 156/275 |
| 3,378,672 | 4/1968 | Blumenkranz | 156/275 |
| 3,406,055 | 10/1968 | Rubel | 156/275 |
| 3,506,519 | 4/1970 | Blumenkranz | 156/275 |
| 3,669,738 | 6/1972 | Cottis et al. | 117/21 X |
| 3,671,346 | 6/1972 | Tsuzuki | 156/275 X |
| 3,734,795 | 5/1973 | Griffith | 156/275 X |

Primary Examiner—Daniel J. Fritsch
Assistant Examiner—M. G. Wityshyn
Attorney, Agent, or Firm—Ralf H. Siegemund

[57] ABSTRACT

Surfaces of thermoplastic parts are welded by placing a star-shaped heating element in-between the parts. The element is a coiled wire jacketed in plastic which melts during the welding. The resulting bond covers a relatively large area. The method is used for providing a saddle flange to a thermoplastic tube.

8 Claims, 4 Drawing Figures

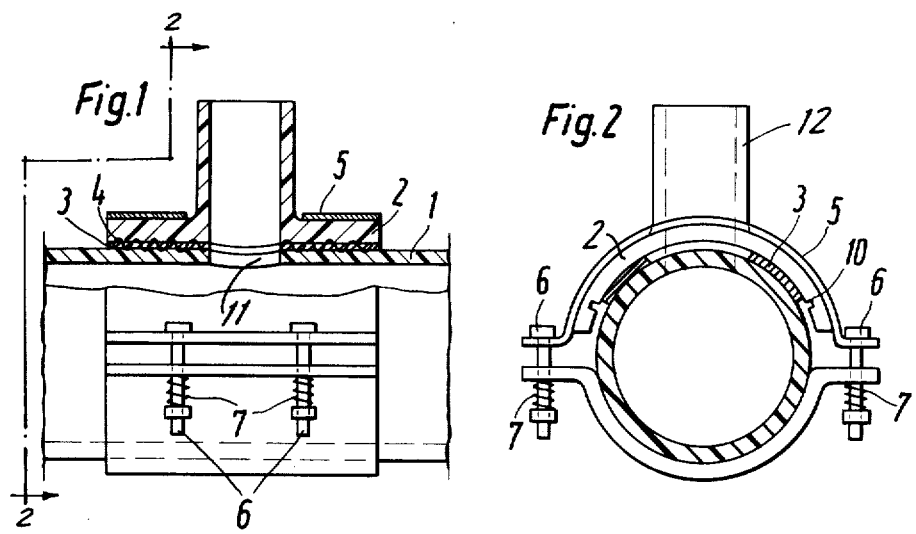
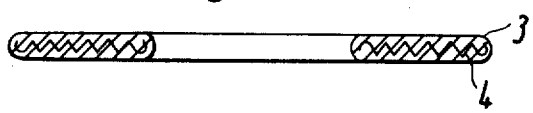
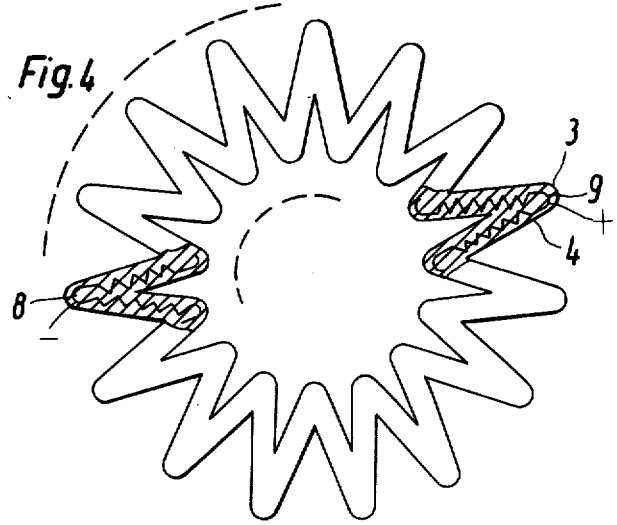

WELDING OF THERMOPLASTICS THROUGH RESISTANCE HEATING

This is a continuation of application Ser. No. 256,384 filed May 24, 1972 now abandoned.

BACKGROUND OF THE INVENTION

The present invention relates to welding of thermoplastic parts, using a heating element which remains embedded. More particularly, the invention relates to thermoplastic welding through resistance heating for effecting a welding bond over relatively large surface areas of the parts to be joined through these areas. Preferably, the invention is practiced for welding a saddle flange to the surface of a thermoplastic tube.

Various heating elements for effecting a welding bond between thermoplastics have become known. These elements are usually comprised of one or several metallic wires for resistance heating. The wire or wires are disposed between the plastic parts. Upon feeding current to the wire or wires, the plastic material softens and liquifies, and fuses as to the different parts which, thereupon, are bonded rather homogenically. The resistance elements remains embedded in the plastic.

The known heating elements of that type are usually suitable only in welding sleeves or for local welding of parts, more or less equivalent to spot or seam welding. They are not well suited for providing a large area contact between two parts which engage each other over relatively large surface portions.

DESCRIPTION OF THE INVENTION

It is an object of the present invention to use a particular heating element for resistive heating for purposes of welding thermoplastics to obtain fusion over relatively large surface areas.

In accordance with the preferred embodiment of the invention, it is suggested to use a coiled resistance wire of flat, star-shaped configuration. Preferably, the resistance wire outlines a star pattern in an annular arrangement, whereby the connecting terminals are established on oppositely located points.

The resistance wire is preferably covered with thermoplastics provided onto the wire by placing the wire into thermoplastic powder, driving current through the wire or heating it otherwise so that the adjacent thermoplastic powder melts and adheres to the wire. Upon removal, the wire is jacketed with the material.

In some cases the heating element may just be placed between the surface to be bonded, without any affixation. If however, the surfaces to be welded are, for example, vertical or slanted, it may be better to connect the heating element to one of the surfaces. The star-shaped heating element may be bonded to one surface, e.g. through brief softening of its plastic jacket. For welding proper, it is advisable to force one of the parts against the other so that the heating element is partially pressed into both parts and embedded partially in each of them, inside of the bond.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a sleeve element to be welded to a tube, both elements shown partially in cross section;

FIG. 2 is a view in axial direction along lines 2—2 of the arrangement shown in FIG. 1;

FIG. 3 is an edge view of the heating element used in the process of FIGS. 1 and 2 in accordance with the preferred embodiment of the invention; and FIG. 4 is a top elevation of the said heating element, partially cut open.

DESCRIPTION OF THE DRAWINGS

Proceeding now to the detailed description of the drawings, the heating element to be employed is depicted in detail in FIGS. 3 and 4, as it is comprised of a helically coiled resistance wire 3, wherein the helical configuration is externally obliterated by embedding the wire in a thermoplastic jacket 4. The jacketed wire is bent into a star pattern in closed, annular configuration, wherein the alternating star projections are arranged in a ring pattern. The wire ends are interconnected so that the wire forms a closed loop. The wire is externally accessible through taps or lead-in wires 8 and 9, which are provided on two opposing star points for connection to two different sources of electrical voltage potential. The dotted lines in FIG. 4 represent an annular welding zone or zone of fusion as between parts interfacing in the plane of the drawing of FIG. 4.

FIG. 1 illustrates a thermoplastic tube 1 having a lateral port 11, and a sleeve 12 with convexly contoured, saddle-like flange 2, to be connected to the tube in alignment with port 11. Particularly, the concave flange 2 is to be welded to the tube's surface. The part 2–12 is also made of thermoplastic.

For purposes of welding flange 2 to tube 1, the star-shaped heating element is placed onto the tube so as to surround the opening 11, and flange 2 is then placed onto the star in position so that the tube 12 is aligned with part 11. Alternately, the star-shaped heating element may be placed onto the concavely shaped surface of flange 2, surrounding the end of tube 12. Heating current is then briefly applied to the wire ends 8 and 9 so that the jacket 4 softens somewhat and provides a bond of the heating element to flange 2.

After these several elements have been placed in proper position, electric current is fed to the star through the projecting and accessible wires 8 and 9 and concurrently flange 2 is forced against tube 1. The Figures illustrate also equipment for applying welding pressure. A two-part clamping element 5 is placed onto tube 1 and flange 2, and the two parts are interconnected by bolts 6, having springs 7 which bear against nuts threaded onto the bolts. As a consequence, the area of flange 2 facing the tube 1 softens, so does the surface portion of the tube 1 covered by the flange and the pressure as applied by the clamp forces the star into both elements as the fuse. Upon completion of welding a fluid tight connection has been established, the clamp will be removed, e.g., after the plastic has solidified again.

FIG. 2 illustrates a further refinement. Flange 2 is provided with an annular groove 10, running just outside of the star-shaped heating element when in proper position. This groove serves for collecting the plastic of jacket 4 as it melts curing the welding process. This way, the additional material of the jacket introduced into the system will not impede uniformity in the mechanical connection and welding bond as established over the flange area.

The invention is not limited to the embodiments described above but all changes and modifications thereof not constituting departures from the spirit and scope of the invention are intended to be included.

I claim:

1. The method of welding thermoplastic parts whereby an areal bond is to be made between surface portions of the parts comprising:

providing a helically coiled resistance wire as heating element in a configuration outlining a flat star pattern;

placing the star in-between the said surface portions of the parts to be welded, while adapting its configuration to the contour of the surface portions, which cover the star completely on both sides and are being placed in juxtaposition, separated by the heating element, applying electric current to the resistance wire, so that relatively large annular areas of the surface portions as juxtaposed fuse upon softening of the thermoplastic adjacent the star-shaped resistance wire; and forcing said parts against each other, thereby embedding permanently the coiled heating element in between and providing sealed connection as between said parts with anchoring occurring through bonding of thermoplastic material in the interior of the coiled resistance element and around it with the parts proper as forced against each other.

2. Method as in claim 1, wherein the wire forms a closed loop and current is applied to oppositely located points of the star configuration.

3. Method as in claim 1, wherein said wire is first heated and dipped into thermoplastic powder for jacketing the coiled wire.

4. Method as in Claim 1, wherein a first part to be welded is a tube with a lateral port, and a second part to be welded is a sleeve with a saddle-like concave flange to be placed onto the tube, with alignment of the sleeve and of the port, the star-shaped heating element being placed to surround the port.

5. Method as in Claim 4, and including the step of clamping the flange to the tube during welding.

6. Method as in claim 4, including the step of providing the inside of the concavely curved flange with an annular groove looping around the sleeve's axis.

7. Method as in claim 1, including the step of welding the star-shaped heating element first to one of the objects.

8. Method as in claim 1, wherein one of the surface portions is concavely shaped; the other one of the surface portions is convexly shaped, the star element being welded first to one of the surface portions through application of heating current to the element, followed by superimposing the part with the respective other surface and welding the star element thereto, thereby fusing and bonding the parts together.

* * * * *